(12) United States Patent
Singhal et al.

(10) Patent No.: US 8,185,534 B1
(45) Date of Patent: May 22, 2012

(54) CONSOLIDATED RECORD GENERATION WITH STABLE IDENTIFIERS FOR DATA INTEGRATION SYSTEMS

(75) Inventors: Vivek Singhal, San Francisco, CA (US); Zilin Du, Mountain View, CA (US); Deepak Kher, San Jose, CA (US); Akhil Vidwans, Fremont, CA (US)

(73) Assignee: Google Inc., Mountain View, CA (US)

( * ) Notice: Subject to any disclaimer, the term of this patent is extended or adjusted under 35 U.S.C. 154(b) by 541 days.

(21) Appl. No.: 12/366,639

(22) Filed: Feb. 5, 2009

(51) Int. Cl.
 *G06F 17/00* (2006.01)
(52) U.S. Cl. ...................................... 707/741
(58) Field of Classification Search ................ 707/741
 See application file for complete search history.

(56) References Cited

U.S. PATENT DOCUMENTS

| 5,202,986 | A | * | 4/1993 | Nickel | 1/1 |
| 5,490,269 | A | * | 2/1996 | Cohn et al. | 1/1 |
| 7,103,536 | B1 | * | 9/2006 | Kanno | 704/10 |
| 2003/0100960 | A1 | * | 5/2003 | Edwards et al. | 700/28 |
| 2005/0027513 | A1 | * | 2/2005 | Kanno | 704/10 |
| 2009/0216748 | A1 | * | 8/2009 | Kravcik | 707/5 |

* cited by examiner

*Primary Examiner* — James Trujillo
*Assistant Examiner* — Kurt Mueller
(74) *Attorney, Agent, or Firm* — Brake Hughes Bellermann LLP

(57) ABSTRACT

A plurality of source records are obtained from a plurality of source record databases, where the plurality of source records includes information regarding a common entity. A consolidated record is generated including selected information regarding the common entity, obtained from the plurality of source records. Identifier prefix values, different for each of the plurality of source record databases, are obtained and a plurality of source record identifiers are obtained that are stored in the source record databases and are associated with the plurality of source records. An ordered set of candidate consolidation identifiers is determined based on prepending identifier prefix values to the source record identifiers. A consolidated record identifier is determined based on selecting an extreme value of the set of candidate consolidation identifiers, and is stored in association with the consolidated record in a consolidated record database for identification and retrieval of the consolidated record.

20 Claims, 4 Drawing Sheets

CONSOLIDATED RECORD GENERATION WITH STABLE IDENTIFIERS FOR DATA INTEGRATION SYSTEMS

TECHNICAL FIELD

This description relates to generating consolidated records with stable identifiers for data integration systems. This description further relates to generating consolidated records with stable identifiers for customer data integration systems.

BACKGROUND

A customer data integration (CDI) system generally consists of a set of programs, databases, and business processes for generating a complete and accurate data view of the customers of a business. For example, a CDI system may obtain customer records from various "source" databases within a business. The source customer records ("source records") are consolidated by the CDI system. Thus, the CDI system may identify groups of similar or identical source records that are duplicate or redundant. For each of these groups of records, the CDI system may generate a consolidated customer record ("consolidated record") by merging the source records. The CDI system may also record which source records were merged to generate the consolidated record. For source records that are dissimilar to all other source records (i.e., for which there is no duplicate or redundant source record), the CDI system still generates a corresponding consolidated record. Thus, an output of a CDI system constitutes an authoritative list of customers (i.e., the consolidated records) and the corresponding source records.

These consolidated records may enable a business to provide higher quality customer service and to gain insights about its customers. For example, the records of a CDI system may be utilized by customer relationship management (CRM) applications and analytic reporting systems.

The consolidated records generated by a CDI system may be stored in a database, wherein each consolidated record is assigned a unique identifier (e.g., a "key"). Other systems may then access the consolidated records, and may, for example, link auxiliary data to the consolidated records, using the unique identifier as a "foreign key" reference.

In order to maintain integrity of the CDI system, the source databases may be scanned periodically for changes, and the CDI system updated accordingly. During update, care should be exercised to ensure that the keys for consolidated records are not unnecessarily modified, because systems that utilize the consolidated records may have linked auxiliary data to those records.

Problem may arise, however, when the source records in the CDI system need to be reconsolidated from scratch. For example, if one or more rules for identifying similar or identical records changes, or if a structural representation of customers or other entities represented by the source databases is significantly revised, then the existing consolidated records may no longer be valid and the source records may need to be reconsolidated. However, this may be disruptive to systems that have already utilized the consolidated records, for example, because the linkages from the auxiliary data to the keys may be invalid.

SUMMARY

In a first general aspect, a system includes an instruction store configured to store machine-executable instructions, an instruction processor configured to execute at least a portion of the machine-executable instructions stored in the instruction store, and a source record accumulator configured to obtain a plurality of source records from a plurality of source record databases, where the plurality of source records include information regarding a common entity. The system further includes a consolidated record generator configured to generate a consolidated record including selected information regarding the common entity, obtained from the plurality of source records; and a consolidated identifier engine. The consolidated identifier engine includes a prefix engine configured to obtain identifier prefix values that are different for each of the plurality of source record databases, a source identifier engine configured to obtain a plurality of source record identifiers that are stored in the source record databases and are associated with the plurality of source records, and a candidate identifier engine configured to determine an ordered set of candidate consolidation identifiers based on prepending identifier prefix values to the source record identifiers based on identification of the source record databases that include the source record identifiers. The consolidated identifier engine further includes an identifier selection engine configured to determine a consolidated record identifier based on selecting an extreme value of the set of candidate consolidation identifiers and a consolidated identifier storage engine configured to store the consolidated record identifier in association with the consolidated record in a consolidated record database for identification and retrieval of the consolidated record.

In another general aspect, a computer program product being tangibly embodied on a computer-readable medium and includes machine-readable executable instructions that, when executed, cause a data processing apparatus to: obtain a plurality of source records from a plurality of source record databases, where the plurality of source records include information regarding a common entity; generate a consolidated record including selected information regarding the common entity, obtained from the plurality of source records; obtain identifier prefix values that are different for each of the plurality of source record databases; obtain a plurality of source record identifiers that are stored in the source record databases and are associated with the plurality of source records; determine an ordered set of candidate consolidation identifiers based on prepending identifier prefix values to the source record identifiers based on identification of the source record databases that include the source record identifiers; determine a consolidated record identifier based on selecting an extreme value of the set of candidate consolidation identifiers; and store the consolidated record identifier in association with the consolidated record in a consolidated record database for identification and retrieval of the consolidated record.

In another general aspect, a computer-implemented method includes obtaining a plurality of source records from a plurality of source record databases stored in one or more storage devices, where the plurality of source records includes information regarding a common entity, and generating a consolidated record including selected information regarding the common entity, obtained from the plurality of source records. The method further includes obtaining identifier prefix values that are different for each of the plurality of source record databases and obtaining a plurality of source record identifiers that are stored in the source record databases and are associated with the plurality of source records. An ordered set of candidate consolidation identifiers is determined based on prepending identifier prefix values to the source record identifiers based on identification of the source record databases that include the source record identifiers. A consolidated record identifier is determined based on selecting an extreme value of the set of candidate consolidation identifiers, and the consolidated record identifier is stored in association with the consolidated record in a consolidated record database in one or more storage devices for identification and retrieval of the consolidated record.

Implementations can include one or more of the following features. For example, it can also be determined whether a previously consolidated record is stored in association with one of the determined candidate consolidation identifiers, and storing the consolidated record identifier includes replacing the previously consolidated record with a newly consolidated record if it is determined that the previously consolidated record is stored in association with the one of the determined candidate consolidation identifiers.

The common entity can include one of a business or a customer. The identifier prefix values can include ordered values assigned to each of the plurality of source record databases in accordance with a priority ordering. The plurality of source record identifiers can include a plurality of unique database record keys associated with the plurality of source records in the respective source record databases. Determining a consolidated record identifier can include determining a consolidated record identifier based on selecting a minimum value of the set of candidate consolidation identifiers. Determining a consolidated record identifier can include determining a consolidated record identifier based on selecting a maximum value of the set of candidate consolidation identifiers.

The details of one or more implementations are set forth in the accompanying drawings and the description below. Other features will be apparent from the description and drawings, and from the claims.

DETAILED DESCRIPTION

A data integration system such as a customer data integration (CDI) system may capture and consolidate records such as customer records from multiple databases on a periodic basis. The consolidated records may then be available for use by other systems, such as customer relationship management (CRM) applications and analytic reporting systems. The example techniques discussed herein generate consolidated records that are assigned unique identifiers, such that the records have consistent, stable identifiers that do not spuriously change over time.

Thus, the example techniques that are provided herein relate to generating consolidated records with stable identifiers for data integration systems. These example techniques may further relate to generating consolidated records with stable identifiers for customer data integration systems.

Figure 1:
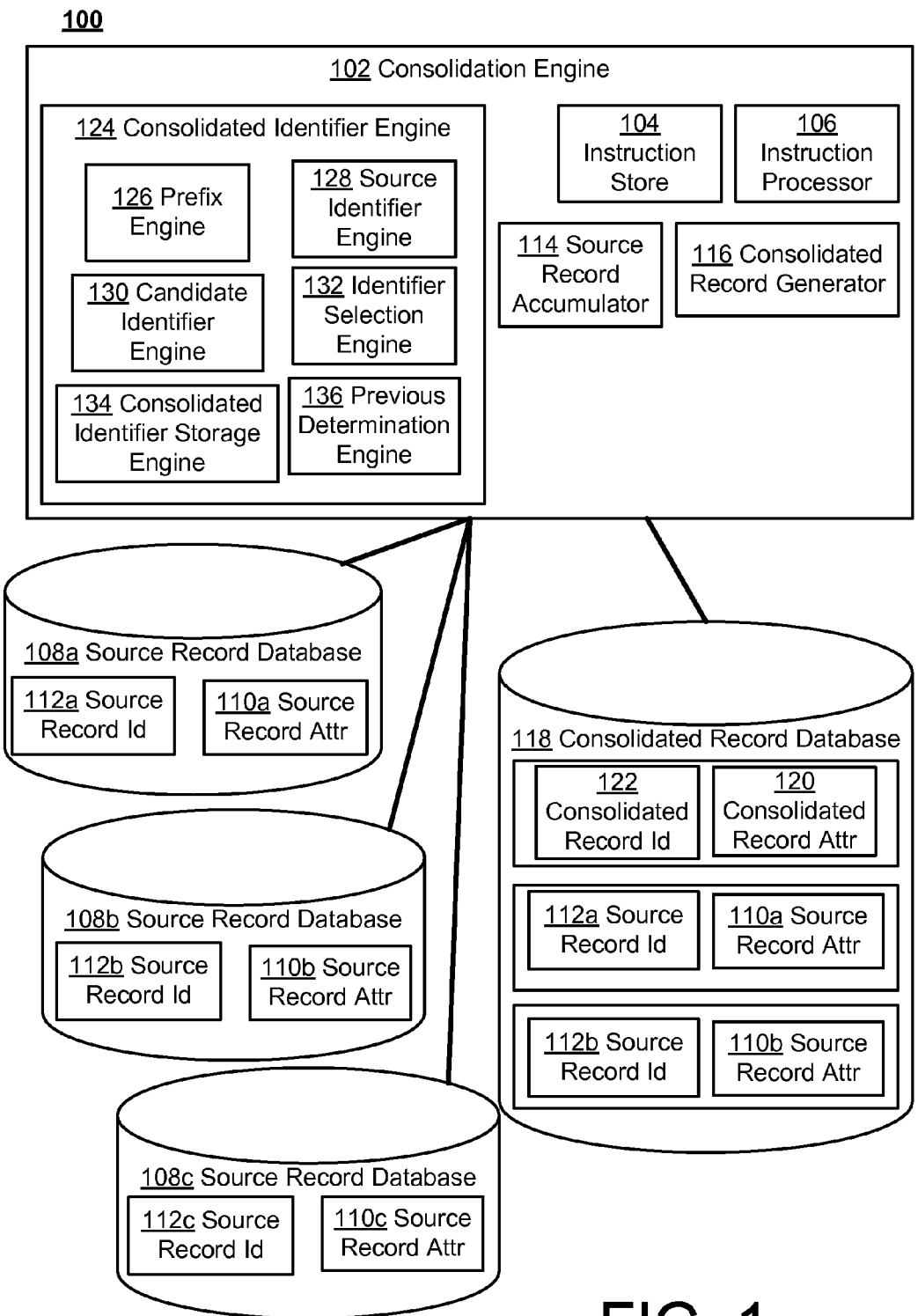
FIG. 1 is a block diagram of an example system for generating consolidated records with stable identifiers for data integration systems.

FIG. 1 is a block diagram of an example system 100 for generating consolidated records with stable identifiers for data integration systems. In one example implementation, the system 100 may include a consolidation engine 102 that may include one or more instruction stores 104 for storing machine-executable instructions configured to cause one or more machines or devices to perform example techniques as discussed herein. The instruction store 104 may include a memory or machine-readable storage medium, as discussed further below. The consolidation engine 102 may include one or more instruction processors 106 for executing instructions, for example, stored in the instruction store 104, such as the machine-executable instructions, as discussed further below.

The consolidation engine 102 may communicate with one or more source record databases 108a, 108b, 108c that may be configured to store source records for use by a database user such as a business user. For example, the source record databases 108a, 108b, 108c may be relational databases or any other type of databases used to store and retrieve information. While the source record databases 108a, 108b, 108c are shown in FIG. 1 as local to the consolidation engine 102, one skilled in the art of data processing will appreciate that the source record databases 108a, 108b, 108c may also be located in any type of private network or public network. For example, the network may include any type of wired and/or wireless communication network such as, for example, the Internet, a cellular network, a messaging network, a local network, or any other type of communication network. A user (not shown) may also communicate with the consolidation engine 102 directly or via a network, a computer, a cellular phone, a mobile computing device, a personal digital assistant (PDA) or other computing and/or phone or other communication type device.

As used herein a "user" can be an individual person or a group of people (e.g., an organization) that share a computing resource, such as employees of a small business that share a server computer, a personal computer, or a cluster of computers.

The source record databases 108a, 108b, 108c may include records stored in the databases for retrieval by one or more users. For example, the source record databases 108a, 108b, 108c may include source record identifiers 112a, 112b, 112c respectively and source record attributes 110a, 110b, 110c respectively. For example, retrieval of the records may be based on requesting information based on record identifier values or attribute values.

The consolidation engine 102 may include a source record accumulator 114 configured to obtain a plurality of source records from a plurality of source record databases (e.g., the source record databases 108a, 108b, 108c), wherein the plurality of source records include information regarding a common entity. In an example implementation, common entity corresponds to a business or a customer.

The consolidation engine 102 may include a consolidated record generator 116 configured to generate a consolidated record including selected information regarding the common entity, obtained from the plurality of source records. For example, the consolidated record generator 116 may generate consolidated records based on selected information obtained from source records stored in the source record databases 108a, 108b, 108c. The consolidated record database 118 may be configured to store the generated consolidated records. For example, the consolidated record database 118 may be configured to store consolidated records, including consolidated record identifiers 122 and record attributes 120, as discussed further below.

The consolidation engine 102 may include a consolidated identifier engine 124 configured to generate and manage identifiers assigned to consolidated records, for storage and retrieval operations associated with the consolidated record database 118. For example, the consolidated identifier engine 124 may manage identifiers assigned to consolidated records generated by the consolidated record generator 116, as discussed further below.

The consolidated identifier engine 124 may include a prefix engine 126 configured to obtain identifier prefix values that are unique for each of the plurality of source record databases. In an example implementation, the identifier prefix values may include ordered values assigned to each of the plurality of source record databases in accordance with a priority ordering. For example, the source record database 108a may be associated with an identifier prefix value of "A," the source record database 108b may be associated with an identifier prefix value of "B," and the source record database 108c may be associated with an identifier prefix value of "C," as discussed further below.

The consolidated identifier engine 124 may include a source identifier engine 128 configured to obtain a plurality of source record identifiers that are stored in the source record databases and are associated with the plurality of source records. In an example implementation, the plurality of source record identifiers may include a plurality of unique database record keys associated with the plurality of source records in the respective source record databases. For example, the source identifier engine 128 may obtain source record identifiers from the source record databases 108a, 108b, 108c (e.g., the source record identifiers 112a, 112b, 112c respectively), corresponding to the respective source records.

The consolidated identifier engine 124 may include a candidate identifier engine 130 configured to determine an ordered set of candidate consolidation identifiers based on prepending identifier prefix values to the source record identifiers based on identification of the source record databases that include the source record identifiers.

The consolidated identifier engine 124 may include an identifier selection engine 132 configured to determine a consolidated record identifier based on selecting an extreme value of the set of candidate consolidation identifiers. In an example implementation, the identifier selection engine 132 may be configured to determine the consolidated record identifier based on selecting a minimum value of the set of candidate consolidation identifiers. In another example implementation, the identifier selection engine 132 may be configured to determine the consolidated record identifier based on selecting a maximum value of the set of candidate consolidation identifiers.

The consolidated identifier engine 124 may include a consolidated identifier storage engine 134 configured to store the consolidated record identifier in association with the consolidated record in a consolidated record database for identification and retrieval of the consolidated record. For example, the consolidated identifier storage engine 134 may store the consolidated record identifier 122 in association with the consolidated record attributes 120 in the consolidated record database 118.

In an example implementation, the consolidated identifier engine 124 may include a previous determination engine 136 configured to calculate whether the consolidated record database 118 previously stored a record with a given consolidated record identifier value, and if so, replace the previously consolidated record with the newly consolidated record.

Other features and functionalities of the components illustrated in FIG. 1 are described in more detail below in to FIGS. 2-4.

Figure 2:
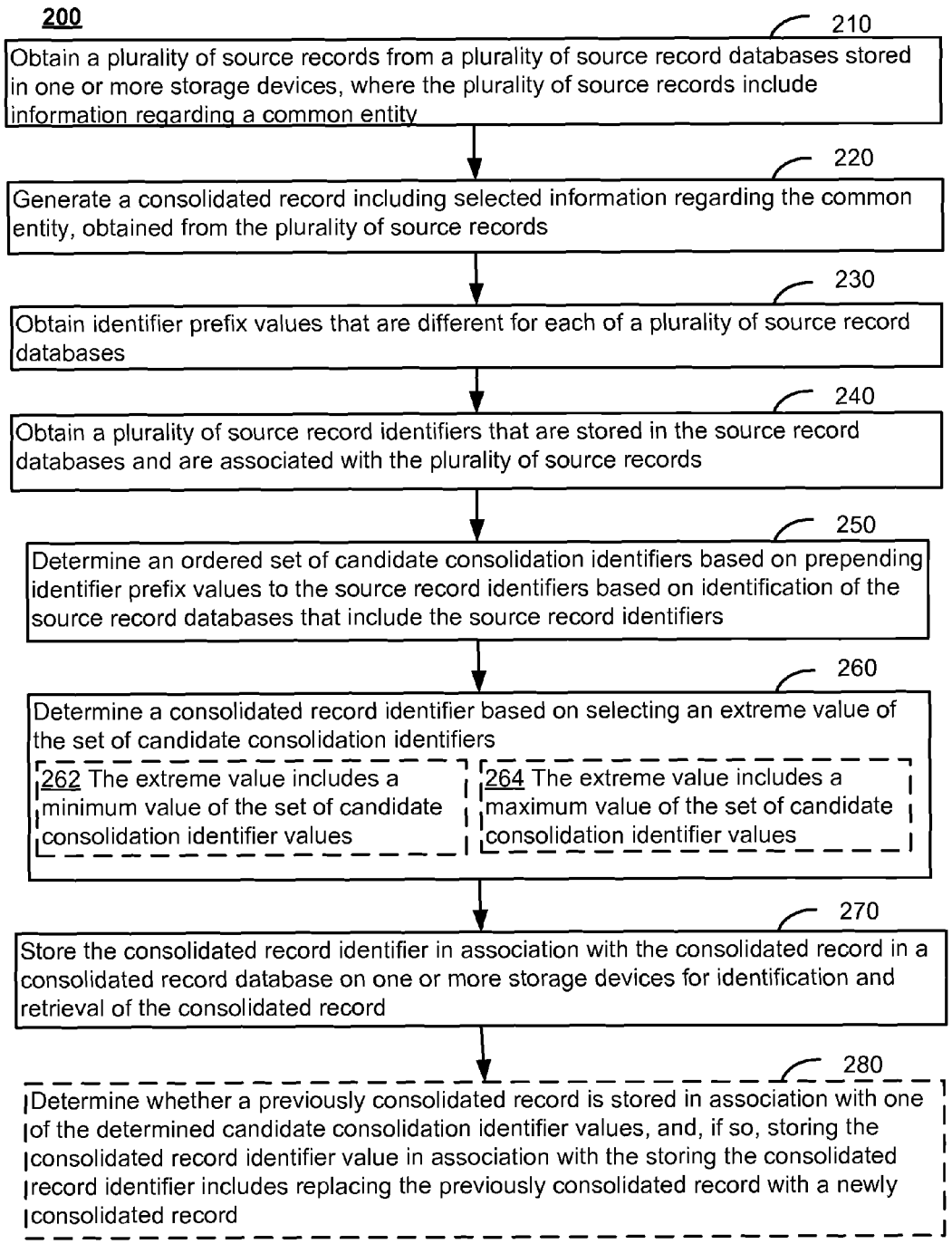
FIG. 2 is an example flow chart of a process for generating consolidated records with stable identifiers for data integration systems in accordance with the example system of FIG. 1.

FIG. 2 illustrates a process 200 for generating consolidated records with stable identifiers. Process 200 may include obtaining a plurality of source records from a plurality of source record databases stored in one or more storage devices, where the plurality of source records include information regarding a common entity (210). For example, the source record accumulator 114 obtains the plurality of source records from the source record databases 108a, 108b, and/or 108c, as discussed above. The source record databases can be stored in physical storage devices, a discussed in more detail below. Different databases can be stored in different storage devices. In one example implementation, the entity corresponds to a business or a customer.

The method may include generating a consolidated record including selected information regarding the common entity, obtained from the plurality of source records (220). For example, the consolidated record generator 116 generates consolidated records based on selected information obtained from source records stored in the source record databases 108a, 108b, 108c, as discussed above. The consolidated record can be generated by a processor, as described in more detail below.

The method may include obtaining identifier prefix values that are different for each of the plurality of source record databases (230). For example, the prefix engine 126 obtains identifier prefix values that are different for each of the plurality of source record databases 108a, 108b, 108c, as discussed above. In an example implementation, the identifier prefix values assigns ordered values to each of the plurality of source record databases in accordance with a priority ordering.

A plurality of source record identifiers that are stored in the source record databases and are associated with the plurality of source records may be obtained (240). In an example implementation, the plurality of source record identifiers includes a plurality of unique database record keys associated with the plurality of source records in the respective source record databases. For example, the source identifier engine 128 obtains source record identifiers from the source record databases 108a, 108b, 108c (e.g., the source record identifiers 112a, 112b, 112c respectively, associated with the respective source records), as discussed above.

The method may include determining an ordered set of candidate consolidation identifiers based on prepending to the source record identifiers the appropriate identifier prefix values corresponding to the source record databases from which the source records were obtained (250). For example, the candidate identifier engine 130 determines the ordered set of candidate consolidation identifiers based on prepending identifier prefix values to the source record identifiers, as discussed above. The ordered set of candidate consolidation identifiers can be generated by a processor, as described in more detail below.

The method may include determining a consolidated record identifier based on selecting an extreme value of the set of candidate consolidation identifiers (260). For example, the identifier selection engine 132 determines the consolidated record identifier by selecting an extreme value of the set of candidate consolidation identifiers, as discussed above. In an example implementation, the identifier selection engine 132 determines the consolidated record identifier by selecting a minimum value of the set of candidate consolidation identifiers (262). In an alternate example implementation, the identifier selection engine 132 determines the consolidated record identifier based on selecting a maximum value of the set of candidate consolidation identifiers (264). The consolidated record identifier can be determined by a processor, as described in more detail below.

The method may include storing the consolidated record identifier in association with the consolidated record in a consolidated record database in one or more storage devices for identification and retrieval of the consolidated record (270). For example, the consolidated identifier storage engine 134 stores the consolidated record identifier 122 in association with the consolidated record attributes 120 in the consolidated record database 118, as discussed above. The consolidated record database 118 can be stored on a single storage device or on more than one storage device.

In an example implementation, the method may further determine whether the consolidated record database 118 previously stored a record with a given consolidated record identifier value (280). If so, storing the consolidated record identifier value in association with the consolidated record identifier (270) includes replacing the previously consolidated record with a newly consolidated record (280). For example, the previous determination engine 136 may determine whether a previously consolidated record is stored in the consolidated record database, as discussed above.

Figure 3:
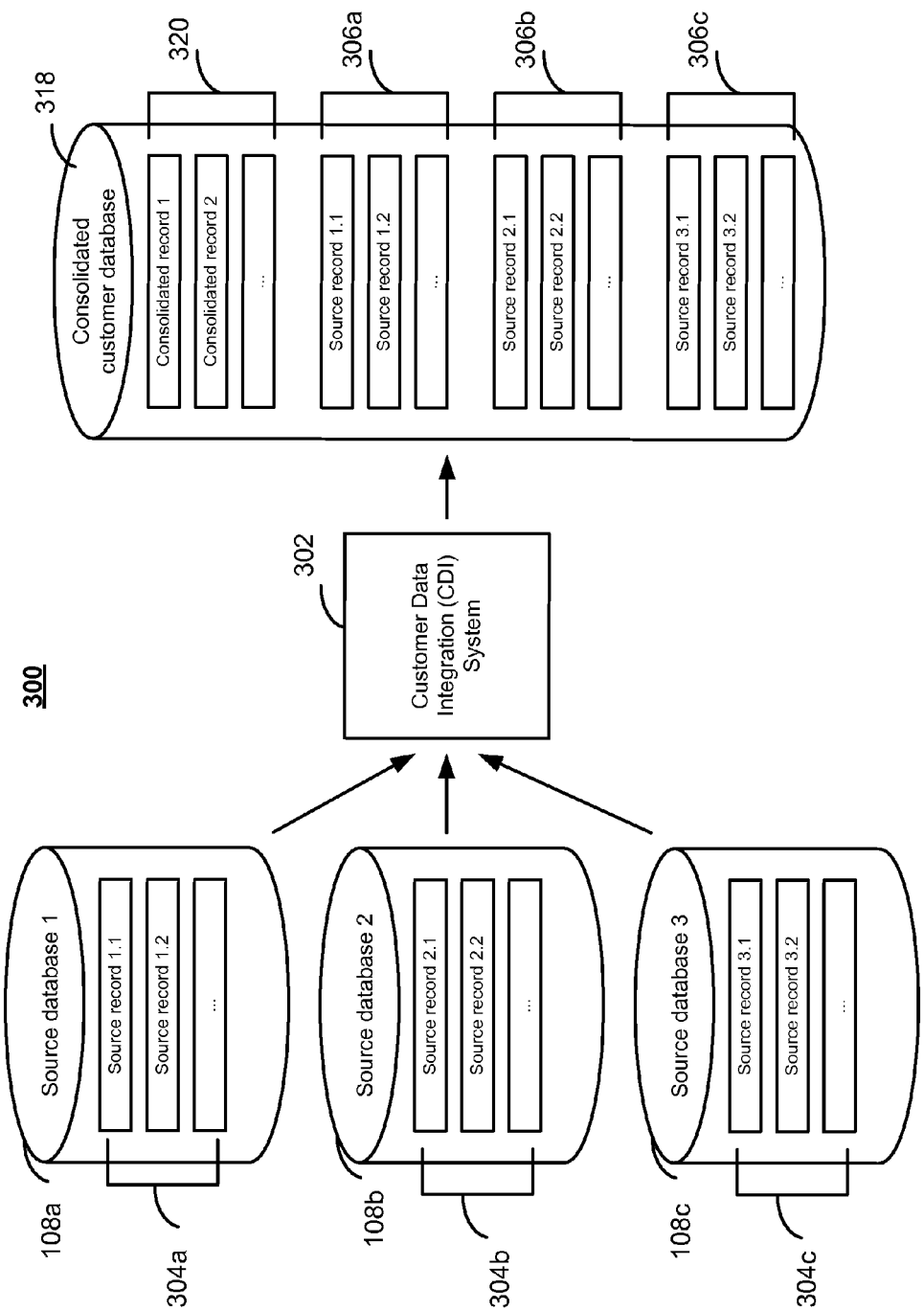
FIG. 3 is a block diagram of an example data integration system including a consolidated database that includes consolidated records with stable identifiers assigned in accordance with the example system of FIG. 1.

FIG. 3 is a block diagram 300 of an example data integration system 302 including a consolidated database that stores consolidated records with stable identifiers assigned in accordance with the system of FIG. 1.

The data integration system 302 may obtain source records 304a, 304b, 304c from the source record databases 108a, 108b, 108c, respectively (e.g., from various source databases located on various storage devices within a business). The source records 304a, 304b, 304c are then consolidated by the CDI system 302. Thus, the CDI system may identify groups of similar or identical source records. For each such group of records, the CDI system 302 may generate a consolidated record, for example, by merging the source records, and store the consolidated record in a consolidated database 318, which may be stored in a storage device. The CDI system 302 may also record which source records were utilized in the generation of the consolidated record. For source records that are dissimilar to all other source records, the CDI system 302 may also generate a corresponding consolidated record. Thus, an output of the CDI system 302 constitutes an authoritative list of customers (e.g., consolidated records 320) and the corresponding source records (e.g., source records 306a, 306b, 306c) as stored in the consolidated database 318.

For example, for a set of source records S that are extracted from source databases on Monday, a set of consolidated records C may be generated on Monday based on the records S. The following expressions indicate that (1a) C is a set of m records $C_1, C_2, \ldots, C_m$; (1b) S is a set of n records $S_1, S_2, \ldots, S_n$; and that (1c) each element $C_i$ of C is generated by applying a merge function on some subset of records $\{S_{i1}, S_{i2}, \ldots, S_{ik}\}$ from S.

$$C = \{C_1, C_2, \ldots, C_m\} \quad (1a)$$

$$S = \{S_1, S_2, \ldots, S_n\}$$

$$\forall C_i \in C, \; C_i = \text{merge}(\{S_{i1}, S_{i2}, \ldots, S_{ik}\}) \quad (1b)$$

where $$\{S_{i1}, S_{i2}, \ldots, S_{ik}\} \subset S \quad (1c)$$

The source records $S_{i1}, S_{i2}, \ldots, S_{ik}$ may be merged based on a determination that they are identical or substantially similar to one another in some aspect. For example, an address of one source record may seem to be more complete than an address for a common entity represented by another source record (e.g., one address may include a street address only, wherein the other address may include a street address and a suite number).

For example, an "Ads" database for a business may include source records on Monday as shown in Table 1 below:

TABLE 1

(Ads database on Monday)

| Key | Name | Address |
|---|---|---|
| 9063 | Acme Software, Inc. | 595 Main Street, Mt. View, CA 94043 |
| 1686 | Bob's Surf Shop | 813 Beach St., Santa Cruz, CA 95060 |

An example "Billing" database for the same business may include source records on Monday as shown in Table 2 below:

TABLE 2

(Billing database on Monday)

| Key | Name | Address |
|---|---|---|
| 4236 | Acme Software | 595 Main Street, Mountain View, CA 94043 |
| 6246 | Acme Software | 595 Main Street, Mountain View, CA 94043 |
| 1415 | Bobs Surf Shop | 813 Beach Street, Santa Cruz, CA, 95060 |

The CDI system 302 may consolidate the records from the Ads database of Table 1 and the Billing database of Table 2 on Monday by generating consolidated records and storing them in a consolidated database 318 as shown in Table 3 below:

TABLE 3

(Consolidated database on Monday)

| Key | Name | Address |
|---|---|---|
| 595895 | Acme Software | 595 Main Street, Mountain View, CA 94043 |
| 262346 | Bob's Surf Shop | 813 Beach St., Santa Cruz, CA 95060 |

As shown in this example, the source records having keys 9063, 4236, and 6246 are merged on Monday to form consolidated record 595895, and the source records having keys 1686 and 1415 are merged on Monday to form consolidated record 262346.

On Tuesday, for example, a set of source records may be extracted and consolidated again. However, Tuesday's source records (S') may be different from Monday's source records (S), as discussed further below. For example, source records may be added, others may be deleted, and still others may be modified. The modifications may represent routine changes to customer records that may occur daily in a database system for a business.

The following expressions indicate that (2a) Tuesday's source records (S') are different from Monday's source records (S); (2b) C' is a set of m records $C'_1, C'_2, \ldots, C'_m$; (2c) S' is a set of n records $S'_1, S'_2, \ldots, S'_n$; and that (2d) each element $C'_i$ of C' is generated by applying a merge function on some subset of records $\{S'_{i1}, S'_{i2}, \ldots, S'_{ik}\}$ from S'.

$$S' \neq S \quad (2a)$$

$$C' = \{C'_1, C'_2, \ldots, C'_m\} \quad (2b)$$

$$S' = \{S'_1, S'_2, \ldots, S'_n\} \quad (2c)$$

$$\forall C'_i \in C', \; C'_i = \text{merge}(\{S'_{i1}, S'_{i2}, \ldots, S'_{ik}\}) \quad (2d)$$

where $$\{S'_{i1}, S_{i2}, \ldots, S'_{ik}\} \subset S'$$

The following example tables illustrate changes in source records that might occur from Monday to Tuesday, and corresponding consolidated records that may be generated as a result of the changes to the source records.

For example, the "Ads" database may include source records on Tuesday as shown in Table 1' below:

TABLE 1

(Ads database on Tuesday)

| Key | Name | Address |
| --- | --- | --- |
| 9063 | Acme Software, Inc. | 595 Main Street, Mt. View, CA 94043 |
| 1686 | Bobby's Surf Shop | 813 Beach St. Santa Cruz, CA 95060 |
| 8153 | Bobby's Surf Shop | 813 Beach, Santa Cruz, CA 95060 |
| 1555 | Acme Software | 595 Main, Mountain View, CA 94043 |
| 8261 | California Motors | 6162 Auto Rd., Fremont, CA 94536 |

The "Billing" database may include source records on Tuesday as shown in Table 2' below:

TABLE 2

(Billing database on Tuesday)

| Key | Name | Address |
| --- | --- | --- |
| 4236 | Acme Software | 595 Main Street, Mountain View, CA 94043 |
| 1415 | Bobs Surf Shop | 813 Beach Street, Santa Cruz, CA, 95060 |

The CDI system 302 may consolidate the records from the Ads database of Table 1' and the Billing database of Table 2' on Tuesday by generating consolidated records and storing them in the consolidated database 318 as shown in Table 3' below:

TABLE 3

(Consolidated database on Tuesday)

| Key | Name | Address |
| --- | --- | --- |
| 595895 | Acme Software | 595 Main Street, Mountain View, CA 94043 |
| 926236 | Bobby's Surf Shop | 813 Beach St., Santa Cruz, CA 95060 |
| 013511 | California Motors | 6162 Auto Rd., Fremont, CA 94536 |

As shown in this example for Tuesday transactions, the source record 1686 was modified, the source record 6246 was deleted, and source records 8153, 1555, and 8261 were introduced. A consolidated record 926236 replaced the consolidated record 262346. Thus, if a system had linked auxiliary data to Monday's consolidated records C, the system may encounter difficulties when it accesses Tuesday's consolidated records C' (e.g., consolidated records shown in Table 3'), because the keys of C (e.g., stored with consolidated records shown in Table 3) and C' are different.

The linkages between auxiliary data A and the consolidated records C may be represented as foreign key references. The following expressions indicate that (3a) A is a set of p records $A_1, A_2, \ldots, A_p$; and (3b) the foreign key $A_i$.fkey of $A_i$ is equal to the key $C_j$.key of $C_j$ where $A_i$ is an element of A and $C_j$ is an element of C.

$$A = \{A_1, A_2, \ldots, A_p\} \quad (3a)$$

$$A_i \epsilon A, \ C_j \epsilon C, \text{ and } A_i.\text{fkey} = C_j.\text{key} \quad (3b)$$

However, as shown in expression (4), the key for $C'_j$ is not necessarily equal to the key for $C_j$:

$$C_j.\text{key} \stackrel{?}{=} C'_j.\text{key} \Rightarrow A_i.\text{fkey} \stackrel{?}{=} C'_j.\text{key} \quad (4)$$

Continuing the example, any auxiliary data that referenced Monday's consolidated record 262346 would now be invalid, because 926236 replaced 262346.

Conventional commercial products that are used to build customer data integration systems, such as IBM WebSphere Customer Center, Purisma Data Hub, and Siperian MDM Hub, perform an initial consolidation of source records. This technique may be computationally-intensive, and may involve weeks or months of processing to complete the initial consolidation. Then, as the source records change, these CDI products may isolate the inserted, deleted, and modified source records. Instead of performing a full consolidation technique again, these commercial CDI products may calculate the net impact of the modified source records.

Many of the consolidated records may be unaffected by the modified source records, so it may be almost trivial for the CDI products to guarantee that the keys for those consolidated records are unchanged. However, for the consolidated records that are affected by the modified source records, the CDI products carefully update the consolidated records, in order to ensure that the keys are unchanged. However, if it does become necessary to perform the full consolidation again after the source records have changed, conventional CDI products do not guarantee that the keys of the newly consolidated records will be the same as the keys from the previous consolidation.

Thus, example techniques discussed herein allow assigning keys to consolidated records, to ensure that the keys are consistently assigned to the consolidated records even if the source records change over time and the full consolidation process needs to be executed again.

The key assignment technique discussed below has two preconditions. First, each source record may have a globally unique key. This precondition is easily satisfied because the source records originate from a database, and each source record has an associated key that is locally unique within the source database. Generation of a globally unique key for each source record may be accomplished by constructing a tuple that includes a source identifier (e.g., a string that denotes the source database) and the source record's local database key.

Second, the source record keys may respect a total ordering for the key values. This precondition is easily satisfied if each component of the tuple includes a total order. For example, a total order for the source identifiers may include the lexicographic (e.g., alphabetic) ordering of the identifier strings associated with the respective source record databases. The local database keys of the source records already adhere to a total ordering (because this is a standard practice in databases).

By requiring a total order of the source record keys, it is possible to determine an extreme value, such as a "minimum" key for a set of source records. This minimum key may be used as the key for the consolidated record. One skilled in the art of data processing may appreciate that any type of extreme value in an ordering may also be used (e.g., a maximum value), without departing from the scope of the discussion herein.

Consider the consolidated records C and source records S for Monday, as discussed above with regard to Table 1. The following expression (5) indicates an example technique for determining a consolidated record identifier (a key) for a consolidated record $C_i$:

$$\forall C_i \epsilon C, \; C_i.\text{key}=\min(S_{i1}.\text{key}, S_{i2}.\text{key}, \ldots, S_{ik}.\text{key}) \quad (5)$$

Similarly, for the consolidated records C' and source records S' for Tuesday, the following expression (6) indicates an example technique for determining a consolidated record identifier (a key) for a consolidated record $C'_i$:

$$\forall C'_i \epsilon C', \; C'_i.\text{key}=\min(S'_{i1}.\text{key}, S'_{i2}.\text{key}, \ldots, S'_{ik}.\text{key}) \quad (6)$$

Continuing with the same example, a total ordering may be established by assigning the string "A" to refer to source records that originate from the Ads database (i.e., example source records shown in Table 1 and Table 1') and "B" for source records from the Billing database (i.e., example source records shown in Table 2 and Table 2'). The consolidated record identifier may be computed by prepending these strings to the respective original source record numeric keys.

For example, the CDI system 302 may consolidate the records from the Ads database of Table 1 and the Billing database of Table 2 on Monday by generating consolidated records utilizing these example prefixes and storing them in a consolidated database as shown in Table 4 below:

TABLE 4

(Consolidated database on Monday, with identifier prefixes)

| Key | Name | Address |
|---|---|---|
| A9063 | Acme Software | 595 Main Street, Mountain View, CA 94043 |
| A1686 | Bob's Surf Shop | 813 Beach St. Santa Cruz, CA 95060 |

Similarly, the CDI system 302 may consolidate the records from the Ads database of Table 1' and the Billing database of Table 2' on Tuesday by generating consolidated records utilizing these prefixes and storing them in the consolidated database as shown in Table 4' below:

TABLE 4'

(Consolidated database on Tuesday, with identifier prefixes)

| Key | Name | Address |
|---|---|---|
| A1555 | Acme Software | 595 Main Street, Mountain View, CA 94043 |
| A1686 | Bobby's Surf Shop | 813 Beach St. Santa Cruz, CA 95060 |
| A8261 | California Motors | 6162 Auto Rd., Fremont, CA 94536 |

As discussed below in the context of various example scenarios 1-3, it can be demonstrated that the example techniques discussed herein for generating consolidated records with consolidated identifiers based on prefixes generate consistent, stable keys for the consolidated records in almost every scenario:

Scenario 1: for $C'_i \epsilon C'$, there exists $C_j \epsilon C$ such that $C'_i.\text{key}=C_j.\text{key}$. In other words, there is a consolidated record $C_j$ (from Monday) that has the same key as a consolidated record $C'_i$ (from Tuesday). This example represents a case in which there is a direct correlation between consolidated records from the two days. Consolidated record A1686, as shown in Table 4 and Table 4', is an example illustrating scenario 1.

Scenario 2: for some $C'_i \epsilon C'$, there is no $C_j \epsilon C$ such that $C'_i.\text{key}=C_j.\text{key}$. Thus, there is no consolidated record $C_j$ (from Monday) that has the same key as $C'_i$ (from Tuesday).

Scenario 2a: a new source record may have been introduced on Tuesday; to verify, search for $C'_i.\text{key}$ in S (the source records from Monday). If the key is not found, then the source record was introduced on Tuesday. Consolidated record A8261, as shown in Table 4' but not in Table 4, is an example illustrating scenario 2a.

Scenario 2b: alternately, if the key is found, then a set of source records were merged into one consolidated record on Monday, but into two consolidated records on Tuesday (because the Tuesday source records are now dissimilar or because the matching rules changed).

Scenario 3: there exists $C_j \epsilon C$ but there is no $C'_i \epsilon C'$ such that $C'_i.\text{key}=C_j.\text{key}$. In other words, there is no consolidated $C'_i$ (from Tuesday) that has the same key as $C_j$ (from Monday).

Scenario 3a: a source record may have been deleted on Tuesday; to verify, search for $C_j.\text{key}$ in S' (the source records from Tuesday). If the key is not found, then the source record was deleted on Tuesday.

Scenario 3b: alternately, if the $C_j.\text{key}$ is found in S', then the set of source records that were merged on Tuesday included a different "extreme" value than Monday. In other words, the records merged on Tuesday included a record that was less than the previous minimum source record from Monday's consolidation. Consolidated record A1555, as shown in Table 4' but not in Table 4, is an example illustrating scenario 3b.

Example Scenario 3b represents a situation wherein a set of source records were merged into a consolidated record $C_j$ on Monday, but when the same records (plus some additional source records) were merged on Tuesday, a different key was assigned to the consolidated record.

The following expression (7) illustrates a technique for determining a consolidated record identifier (a key) for a consolidated record $C_j$:

$$C_j \epsilon C, \; C_j.\text{key}=\min(S_{j1}.\text{key}, S_{j2}.\text{key}, \ldots, S_{jk}.\text{key}) \quad (7)$$

There is no consolidated record in C' that has the same key as $C_j.\text{key}$. However, the minimum source record (i.e., one of $S_{j1}.\text{key}, S_{j2}.\text{key}, S_{jk}.\text{key}$) is included in S'. Thus, a different consolidated record $C'_h$ may have been generated based on the same source records plus additional records, as shown in expression (8) below:

$$C'_h \epsilon C', \; C'_h.\text{key}=\min(S_{j1}.\text{key}, \ldots, S_{jk}.\text{key}, S_{h1}.\text{key}, \ldots, S_{hk}.\text{key}) \quad (8)$$

For this example, one of the additional records $S_{h1}.\text{key}, \ldots, S_{hk}.\text{key}$ is the new minimum record, whose key equals $C'_h.\text{key}$. If this new minimum record was previously an element of S (Monday's source record), then two consolidated records from Monday are replaced with a single consolidated record on Tuesday. However, if this new minimum record was newly introduced on Tuesday, the calculated keys for $C_j$ and $C'_h$ are different, even though the source records that were mostly the same were merged to form both consolidated records.

In order to avoid a frequent occurrence of Scenario 3b, a total ordering of the source identifiers must be carefully chosen by a user. For example, the total ordering could be defined such that the source identifier that appears first lexicographically corresponds to a source wherein it is uncommon for newly introduced records to be similar to existing records (according to the matching rules). Moreover, the source identifier that appears last lexicographically corresponds to the source database where this phenomenon occurs most commonly.

Figure 4:
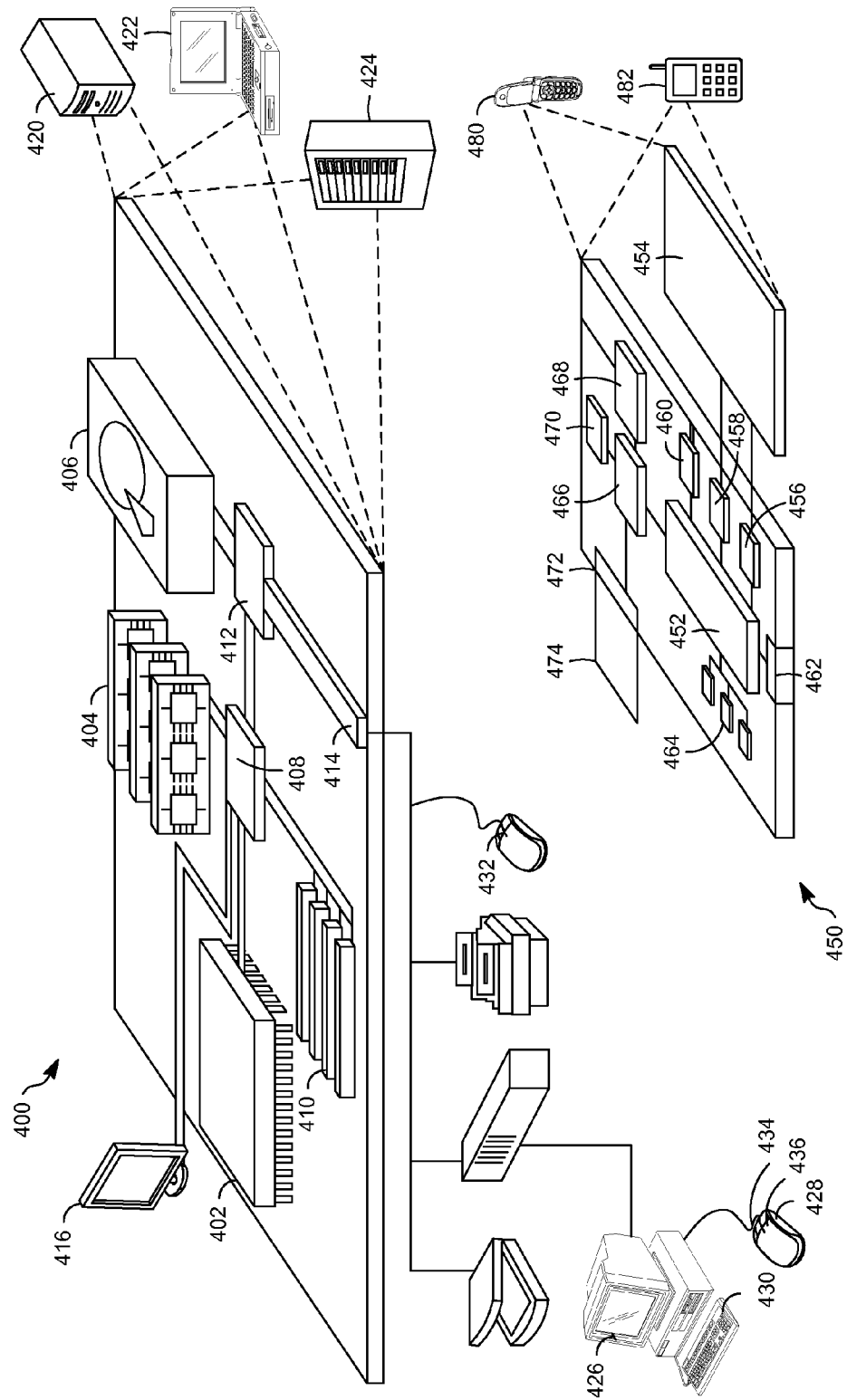
FIG. 4 is a block diagram of an example computer device and an example mobile computer device that can be used to implement example techniques described herein.

FIG. 4 shows an example of a computer device 400 and a mobile computer device 450, which may be used with the example techniques discussed herein. Computing device 400 represents various forms of digital computers, such as laptops, desktops, workstations, personal digital assistants, servers, blade servers, mainframes, and other appropriate computers. Computing device 450 represents various forms of mobile devices, such as personal digital assistants, cellular telephones, smart phones, and other similar computing devices. The components shown herein, their connections and relationships, and their functions, are presented as examples only, and are not intended to limit implementations of the techniques discussed herein.

As shown in FIG. 4, computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various buses, and may be mounted on a common motherboard or in other configurations as appropriate. The processor 402 can process instructions for execution within the computing device 400, including instructions stored in the memory 404 or on the storage device 406 to display graphical information for a graphical user interface (GUI) on an external input/output device, such as display 416 coupled to high speed interface 408. The processor 402 can process instructions that cause the computing device 400, for example, to: generate the consolidated record that included selected information regarding the common entity, obtained from the plurality of source records; determine the ordered set of candidate consolidation identifiers; and determine the consolidated record identifier as explained above, with reference to FIG. 2. In other implementations, multiple processors and/or multiple buses may be used, as appropriate, along with multiple memories and types of memory. For example, different processors could process instructions to perform the different steps shown in FIG. 1. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may include a computer-readable medium, such as a floppy disk device, a hard disk device, an optical disk device, or a tape device, a flash memory or other similar solid state memory device, or an array of devices, including devices in a storage area network or other configurations. The storage device 406 can store the databases from which the plurality of records are obtained and can store the consolidated record database in which the consolidated record is stored. In another implementation, the computing device 400 can include a plurality of storage devices 406 that can store various different databases from which the plurality of records are obtained and in which the consolidated record is stored. In another implementation, the various different databases from which the plurality of records are obtained and in which the consolidated record is stored can be stored in different storage devices 406 located on different networked computing devices A computer program product can be tangibly embodied in an information carrier. The computer program product may also embody instructions that, when executed, perform one or more methods, such as those described above. The information carrier may include a computer-readable or machine-readable medium, such as the memory 404, the storage device 406, or memory on processor 402.

The high speed controller 408 may manage bandwidth-intensive operations for the computing device 400, while the low speed controller 412 may manage lower bandwidth-intensive operations, although these are merely examples of allocations. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a display 426, a keyboard 430, a pointing device (e.g., a mouse 432 or mouse 428 having buttons 434, 436), a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each device may include one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may include, for example, a TFT LCD (Thin-Film-Transistor Liquid Crystal Display) or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product includes instructions that, when executed, perform one or more methods, such as those described above. The information carrier is a computer-readable or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where desired. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in FIG. 4. For example, it may be implemented as a cellular telephone 480. It may also be implemented as part of a smart phone 482, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the discussion herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or computer-readable storage medium, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   an instruction store configured to store machine-executable instructions;
   an instruction processor configured to execute at least a portion of the machine-executable instructions stored in the instruction store;
   a source record accumulator configured to obtain a plurality of source records from a plurality of source record databases, wherein the plurality of source records include information regarding a common entity;
   a consolidated record generator configured to generate a consolidated record including selected information regarding the common entity, wherein the selected information is obtained from the plurality of source records; and
   a consolidated identifier engine including:
   (a) a prefix engine configured to obtain identifier prefix values that are different for each of the plurality of source record databases;
   (b) a source identifier engine configured to obtain a plurality of source record identifiers that are stored in the source record databases and are associated with the plurality of source records;
   (c) a candidate identifier engine configured to determine an ordered set of candidate consolidation identifiers based on prepending identifier prefix values to the source record identifiers, wherein the identifier prefix values prepended to the source record identifiers are based on identification of the source record databases that include the source record identifiers;
   (d) an identifier selection engine configured to determine a consolidated record identifier based on selecting an extreme value of the set of candidate consolidation identifiers; and
   (e) a consolidated identifier storage engine configured to store the consolidated record identifier in association with the consolidated record in a consolidated record database for identification and retrieval of the consolidated record.

2. The system of claim 1 further comprising:
   a previous determination engine configured to determine whether a previously consolidated record is stored in association with one of the determined candidate consolidation identifiers, wherein:
   the consolidated identifier storage engine is configured to store the consolidated record identifier by replacing the previously consolidated record with a newly consolidated record if the previous determination engine determines that the previously consolidated record is stored in association with the one of the determined candidate consolidation identifiers.

3. The system of claim 1 wherein the common entity includes one of a business or a customer.

4. The system of claim 1 wherein the identifier prefix values include ordered values assigned to each of the plurality of source record databases in accordance with a priority ordering.

5. The system of claim 1 wherein the plurality of source record identifiers include a plurality of unique database record keys associated with the plurality of source records in the respective source record databases.

6. The system of claim 1 wherein the identifier selection engine is configured to determine a consolidated record identifier based on selecting a minimum value of the set of candidate consolidation identifiers.

7. The system of claim 1 wherein the identifier selection engine is configured to determine a consolidated record identifier based on selecting a maximum value of the set of candidate consolidation identifiers.

8. A computer program product being tangibly embodied on a computer-readable medium and including machine-readable executable instructions that, when executed, cause a data processing apparatus to:
   obtain a plurality of source records from a plurality of source record databases, wherein the plurality of source records include information regarding a common entity;

generate a consolidated record including selected information regarding the common entity, wherein the selected information is obtained from the plurality of source records;

obtain identifier prefix values that are different for each of the plurality of source record databases;

obtain a plurality of source record identifiers that are stored in the source record databases and are associated with the plurality of source records;

determine an ordered set of candidate consolidation identifiers based on prepending identifier prefix values to the source record identifiers, wherein the identifier prefix values prepended to the source record identifiers are based on identification of the source record databases that include the source record identifiers;

determine a consolidated record identifier based on selecting an extreme value of the set of candidate consolidation identifiers; and store the consolidated record identifier in association with the consolidated record in a consolidated record database for identification and retrieval of the consolidated record.

9. The computer program product of claim 8 further including machine-readable executable instructions that, when executed, cause the data processing apparatus to:

determine whether a previously consolidated record is stored in association with one of the determined candidate consolidation identifiers, and, if so, then storing the consolidated record identifier value in association with the consolidated record identifier includes replacing the previously consolidated record with a newly consolidated record.

10. The computer program product of claim 8 wherein the common entity includes one of a business or a customer.

11. The computer program product of claim 8 wherein the identifier prefix values include ordered values assigned to each of the plurality of source record databases in accordance with a priority ordering.

12. The computer program product of claim 8 wherein the plurality of source record identifiers include a plurality of unique database record keys associated with the plurality of source records in the respective source record databases.

13. The computer program product of claim 8 wherein the consolidated record identifier is determined based on selecting a minimum value of the set of candidate consolidation identifiers.

14. The computer program product of claim 8 wherein the consolidated record identifier is determined based on selecting a maximum value of the set of candidate consolidation identifiers.

15. A computer-implemented method comprising:

obtaining, by at least one processor of a computer system, a plurality of source records from a plurality of source record databases, wherein the plurality of source records include information regarding a common entity;

generating, by at least one processor of the computer system, a consolidated record including selected information regarding the common entity, wherein the selected information is obtained from the plurality of source records;

obtaining, by at least one processor of the computer system, identifier prefix values that are different for each of the plurality of source record databases;

obtaining, by at least one processor of the computer system, a plurality of source record identifiers that are stored in the source record databases and that are associated with the obtained plurality of source records;

determining, by at least one processor of the computer system, an ordered set of candidate consolidation identifiers based on prepending identifier prefix values to the source record identifiers, wherein the identifier prefix values prepended to the source record identifiers are based on identification of the source record databases that include the source record identifiers;

determining, by at least one processor of the computer system, a consolidated record identifier based on selecting an extreme value of the set of candidate consolidation identifiers; and storing the consolidated record identifier in association with the consolidated record in a consolidated record database for identification and retrieval of the consolidated record.

16. The computer-implemented method of claim 15 further comprising:

determining whether a previously consolidated record is stored in association with one of the determined candidate consolidation identifiers, and, if so, then storing the consolidated record identifier value in association with the consolidated record identifier includes replacing the previously consolidated record with a newly consolidated record.

17. The computer-implemented method of claim 15 wherein the identifier prefix values include ordered values assigned to each of the plurality of source record databases in accordance with a priority ordering.

18. The computer-implemented method of claim 15 wherein the plurality of source record identifiers include a plurality of unique database record keys associated with the plurality of source records in the respective source record databases.

19. The computer-implemented method of claim 15 wherein determining a consolidated record identifier includes determining a consolidated record identifier based on selecting a minimum value of the set of candidate consolidation identifiers.

20. The computer-implemented method of claim 15 wherein determining a consolidated record identifier includes determining a consolidated record identifier based on selecting a maximum value of the set of candidate consolidation identifiers.

* * * * *